United States Patent
Matsuda et al.

(10) Patent No.: US 9,522,850 B2
(45) Date of Patent: Dec. 20, 2016

(54) METHOD FOR MANUFACTURING CUBIC BORON NITRIDE SINTERED BODY, AND CUBIC BORON NITRIDE SINTERED BODY

(71) Applicant: Sumitomo Electric Hardmetal Corp., Itami-shi (JP)

(72) Inventors: Yusuke Matsuda, Itami (JP); Katsumi Okamura, Itami (JP); Tsutomu Hirano, Itami (JP); Tomohiro Fukaya, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 14/779,400

(22) PCT Filed: Mar. 12, 2014

(86) PCT No.: PCT/JP2014/056404
§ 371 (c)(1),
(2) Date: Sep. 23, 2015

(87) PCT Pub. No.: WO2014/156625
PCT Pub. Date: Oct. 2, 2014

(65) Prior Publication Data
US 2016/0052827 A1    Feb. 25, 2016

(30) Foreign Application Priority Data
Mar. 29, 2013 (JP) ................. 2013-073693

(51) Int. Cl.
| | |
|---|---|
| *C04B 35/00* | (2006.01) |
| *C04B 35/5831* | (2006.01) |
| *C04B 35/628* | (2006.01) |
| *C04B 35/645* | (2006.01) |
| *C22C 26/00* | (2006.01) |
| *C04B 35/63* | (2006.01) |
| *C04B 35/64* | (2006.01) |

(52) U.S. Cl.
CPC ......... *C04B 35/5831* (2013.01); *C04B 35/628* (2013.01); *C04B 35/62842* (2013.01); *C04B 35/62884* (2013.01); *C04B 35/6303* (2013.01); *C04B 35/64* (2013.01); *C04B 35/645* (2013.01); *C22C 26/00* (2013.01); *C04B 2235/386* (2013.01); *C04B 2235/3847* (2013.01); *C04B 2235/402* (2013.01); *C04B 2235/404* (2013.01); *C04B 2235/405* (2013.01); *C04B 2235/6581* (2013.01); *C04B 2235/661* (2013.01); *C22C 2026/003* (2013.01)

(58) Field of Classification Search
CPC ........................ C04B 35/583; C04B 35/5831
(Continued)

(56) References Cited

U.S. PATENT DOCUMENTS

| | | | | |
|---|---|---|---|---|
| 5,043,304 A | * | 8/1991 | Yoshida | ............. C04B 35/645 264/122 |
| 6,001,758 A | * | 12/1999 | Fukaya | ............. C04B 35/5831 501/87 |

(Continued)

FOREIGN PATENT DOCUMENTS

| | | |
|---|---|---|
| JP | 58-60680 A | 4/1983 |
| JP | 61-168569 A | 7/1986 |

(Continued)

OTHER PUBLICATIONS

Partial Supplementary European Search Report in European Patent Application No. 14773327.3 dated Feb. 17, 2016.
(Continued)

*Primary Examiner* — Noah Wiese
(74) *Attorney, Agent, or Firm* — Venable LLP; Michael A. Sartori; F. Brock Riggs

(57) ABSTRACT

Provided is a cubic boron nitride sintered body having good wear resistance and fracture resistance. A method for manufacturing a cubic boron nitride sintered body of the present invention is a method for manufacturing a cubic boron nitride sintered body having a cubic boron nitride particle content of 80% by volume or more and 99% by volume or less. The method includes a first step of preparing cubic boron nitride particles; a second step of coating surfaces of the cubic boron nitride particles with a coating material so as to obtain coated particles; a third step of mixing the coated particles and a binder to obtain a mixture; and a fourth step of sintering the mixture.

10 Claims, 3 Drawing Sheets

(58) Field of Classification Search
USPC .......................................................... 501/96.4
See application file for complete search history.

(56) References Cited

U.S. PATENT DOCUMENTS

| | | | | |
|---|---|---|---|---|
| 6,008,153 | A * | 12/1999 | Kukino | ............... C04B 35/5831 |
| | | | | 501/96.1 |
| 6,337,152 | B1 * | 1/2002 | Kukino | ................. C04B 41/009 |
| | | | | 428/216 |
| 2009/0169840 | A1 | 7/2009 | Okamura et al. | |
| 2013/0000213 | A1 | 1/2013 | Okamura et al. | |

FOREIGN PATENT DOCUMENTS

| | | |
|---|---|---|
| JP | 10-182242 A | 7/1998 |
| JP | 2004-331456 A | 11/2004 |
| WO | WO-2011/111261 A1 | 9/2011 |
| WO | WO-2014/065131 A1 | 5/2014 |

OTHER PUBLICATIONS

Notification of the First Office Action in Chinese Patent Application No. 201480018924.2 dated Jun. 7, 2016.

* cited by examiner

METHOD FOR MANUFACTURING CUBIC BORON NITRIDE SINTERED BODY, AND CUBIC BORON NITRIDE SINTERED BODY

TECHNICAL FIELD

The present invention relates to sintered bodies that contain cubic boron nitride (hereinafter also referred to as cBN) as a main component. In particular, the present invention relates to a high-cBN-content sintered body that has a particularly high cBN content.

BACKGROUND ART cBN is known to have a hardness second to diamond and other characteristics such as high thermal conductivity and low affinity to ferrous materials, and sintered bodies composed of cBN are being used in cutting tools.

cBN sintered bodies used in cutting tools can be roughly categorized into two types based on composition, namely, high-cBN-content sintered bodies and low-cBN-content sintered bodies. The former has a high cBN particle content and has a sintered body structure in which cBN particles directly bond to each other and the rest is bonded with a binder containing Co or Al as a main component. In contrast, the latter has a low cBN particle content and has a sintered body structure in which there are fewer portions where cBN particles come into contact with one another and thus particles bond to each other via a ceramic material such as TiN or TiC.

An example of the high-cBN-content sintered bodies is a cBN sintered body disclosed in PTL 1 including 88% to 97% by volume of cBN, a bonding phase, and unavoidable impurities.

CITATION LIST

Patent Literature

PTL 1: Japanese Unexamined Patent Application Publication No. 2004-331456

SUMMARY OF INVENTION

Technical Problem

High-cBN-content sintered bodies have a sintered body structure in which cBN particles are directly bonded to each other as described above. Sintered body structures in which cBN particles having high thermal conductivity are continuously bonded provide an advantage in that heat generated by friction with workpieces during cutting can be easily dissipated. Accordingly, high-cBN-content sintered bodies are suitable for, for example, cutting cast iron in which damage caused by thermal shock is dominant. Moreover, they are also suitable for cutting sintered alloys in which damage caused by mechanical friction is dominant since the content of cBN particles having high hardness is high.

High-cBN-content sintered bodies have been manufactured by mixing cBN particles and a binder and sintering the resulting mixture under pressure and temperature conditions that do not convert cBN into hexagonal boron nitride (hBN). It is believed that during this process, a component contained in the binder and promoting bonding of cBN particles to each other causes formation of portions where cBN particles are directly bonded to each other (also referred to as neck growth), and a strong sintered body structure can be obtained as a result.

Various elements and compounds have been studied as the binder. It has been believed that a binder constituted by a mixture of several elements or compounds can promote bonding of cBN particles to each other and create strong bonds for the entire sintered body structure due to synergetic actions of the respective components. Accordingly, an established technical principle has been that wear resistance and fracture resistance of sintered body tools can be improved by more homogeneously dispersing a binder into a mixture in obtaining a mixture before sintering; hence, improvements in performance of sintered body tools have continued based on this principle and by improving dispersion processes.

However, in recent years, workpieces have become harder, more difficult to cut, and more complicated in shape, and this has increased the severity of operation conditions for sintered body tools. In particular, cutting complicated shapes often involves interrupted cutting, and there are an increasing number of cases in which tool life is shortened by mechanical wear and edge fractures. Under the current situation, minor improvements based on the aforementioned traditional principle are not enough to fulfill demand of users. Moreover, improvements based on the traditional principle have become substantially saturated and no further major improvements can be expected therefrom.

The present invention has been made under the aforementioned circumstances and its object is to provide a cubic boron nitride sintered body having good wear resistance and fracture resistance.

Solution to Problem

The inventors of the present invention have conducted extensive studies on actions of individual components constituting the sintered body structure in order to address the above-described issue and found that the effect of bonding the entire sintered body structure is more easily exhibited when particular components are localized in particular positions than when the components constituting the binder are homogeneously dispersed in the structure. Further investigations based on this finding have found that a sintered body structure with a dramatically increased bonding strength can be obtained by allowing particular components to localize in grain boundaries between the cBN particles while allowing other components to localize in gaps where cBN particles are absent. Thus, the present invention has been made.

In other words, a method for manufacturing a cubic boron nitride sintered body according to the present invention is a method for manufacturing a cubic boron nitride sintered body having a cubic boron nitride particle content of 80% by volume or more and 99% by volume or less. The method includes a first step of preparing cubic boron nitride particles; a second step of coating surfaces of the cubic boron nitride particles with a coating material so as to obtain coated particles; a third step of mixing the coated particles and a binder to obtain a mixture; and a fourth step of sintering the mixture.

Preferably, the coated particles are particles having substantially all parts of surfaces coated with the coating material.

Preferably, the binder contains at least one element selected from the group consisting of tungsten (W), cobalt (Co), and aluminum (Al). Preferably, the binder further contains at least one element selected from the group consisting of carbon (C), nitrogen (N), boron (B), and oxygen (O).

Preferably, the coating material contains at least one element selected from the group consisting of chromium (Cr), nickel (Ni), and molybdenum (Mo).

Preferably, the second step is a step of coating the cubic boron nitride particles with the coating material by a physical vapor deposition method.

A cubic boron nitride sintered body according to the present invention includes cubic boron nitride particles, a binder, and a coating material, in which a content of the cubic boron nitride particles is 80% by volume or more and 99% by volume or less, the binder contains at least one element selected from the group consisting of tungsten, cobalt, and aluminum, a content of the coating material is 0.1% by mass or more and 1.5% by mass or less, and surfaces of the cubic boron nitride particles are coated with the coating material.

Preferably, substantially all parts of the surfaces of the cubic boron nitride particles in the cubic boron nitride sintered body are coated with the coating material.

Preferably, the binder further contains at least one element selected from the group consisting of carbon, nitrogen, boron, and oxygen.

Preferably, the coating material contains at least one element selected from the group consisting of chromium, nickel, and molybdenum.

The content of the cubic boron nitride particles is preferably 85% by volume or more and 93% by volume or less.

Advantageous Effects of Invention

A cubic boron nitride sintered body according to the present invention has good wear resistance and fracture resistance.

DESCRIPTION OF EMBODIMENTS

Embodiments of the present invention will now be described in further detail.

<Cubic Boron Nitride Sintered Body>

A cubic boron nitride sintered body (hereinafter also referred to as a cBN sintered body) according to an embodiment contains as high as 80% by volume or more of cubic boron nitride particles (hereinafter also referred to as cBN particles) with the balance being a binder and a coating material. This cBN sintered body can form cutting tools suitable for cutting sintered alloys and cast iron. The cBN sintered body of this embodiment may contain any other components as long as the aforementioned components are contained, and inclusion of impurities and the like will pose no impediment.

A cBN sintered body according to this embodiment has a sintered body structure in which cBN particles are coated with a coating material containing particular elements. A cBN sintered body according to this embodiment is described with reference to FIGS. 1 and 2.

Figure 1:
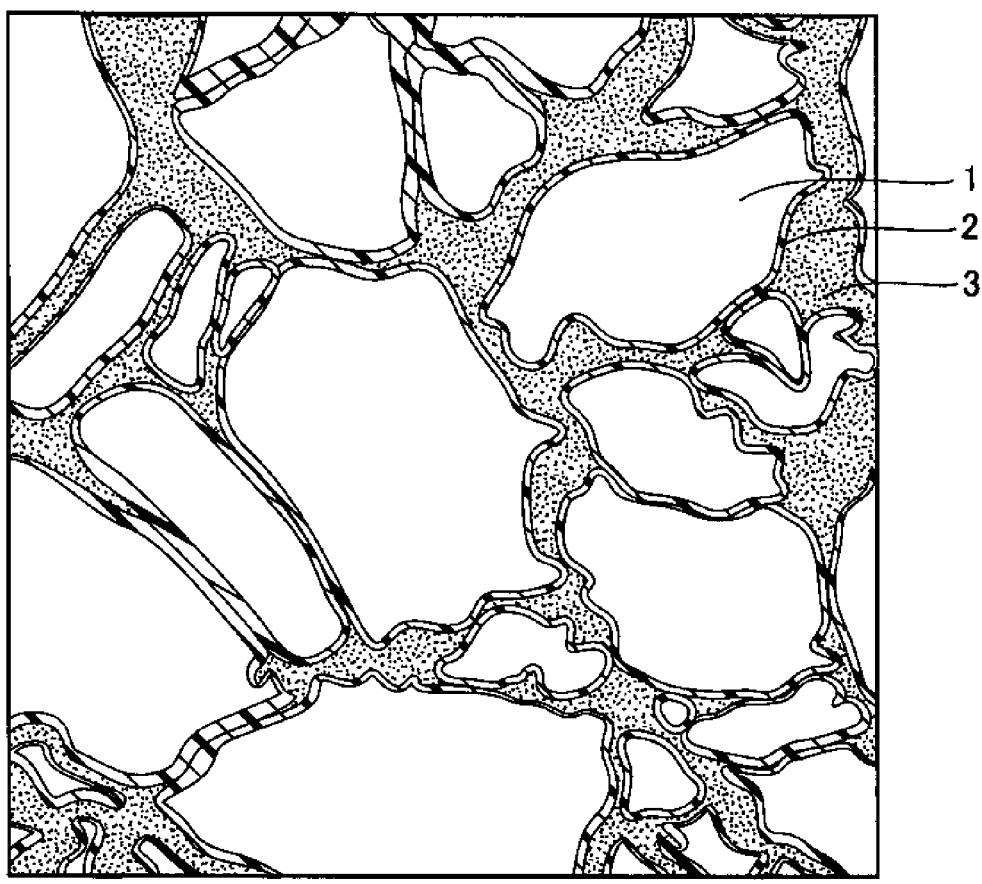
FIG. 1 is a schematic view illustrating an example of a sintered body structure of a cubic boron nitride sintered body according to an embodiment.
Figure 2:
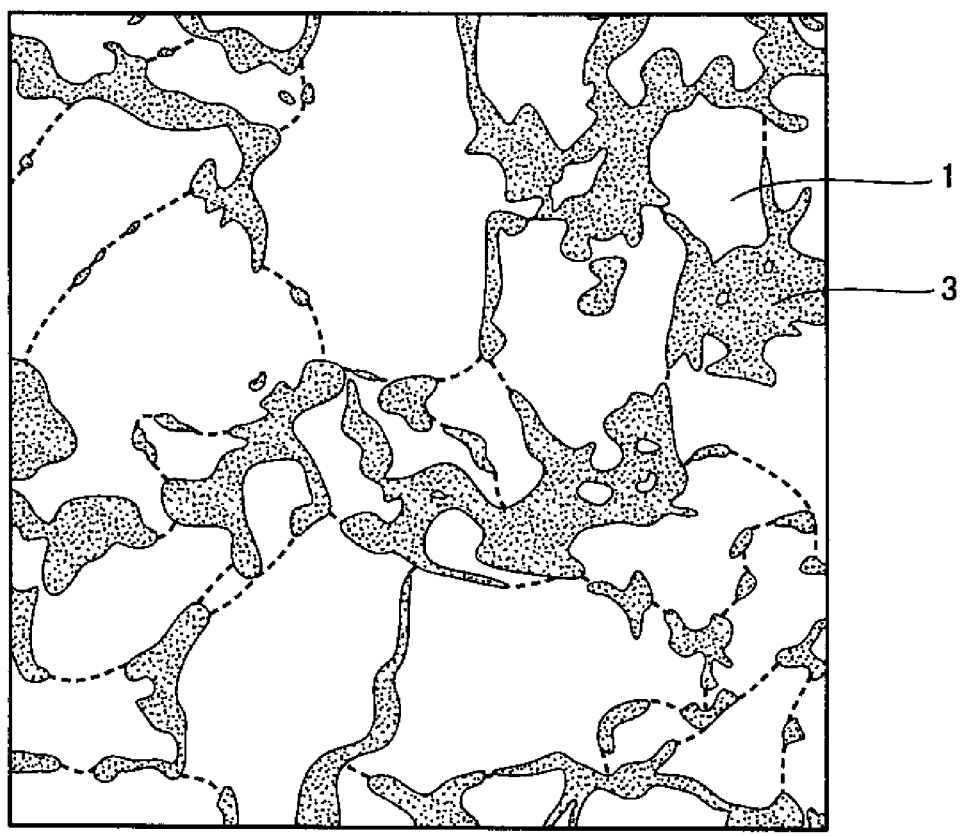
FIG. 2 is a schematic view illustrating an example of a sintered body structure of a conventional cubic boron nitride sintered body.

FIGS. 1 and 2 are schematic views of cross sections of cBN sintered bodies illustrating examples of observation view areas obtained through a scanning transmission electron microscope (STEM) or the like, for example. FIG. 1 shows a cBN sintered body according to this embodiment and FIG. 2 shows a conventional cBN sintered body.

As shown in FIG. 1, in a cBN sintered body of this embodiment, a surface of a cBN particle 1 is coated with a coating material 2. In other words, the cBN particle 1 is a coated particle. Thus, the coating material 2 is evenly distributed in the portion (grain boundary) where cBN particles 1 come into contact with and bond to each other. Although not illustrated in the drawings, neck growth occurs between the particles at the portion where the coated particles come into contact with each other, and particles bond to each other at this portion serving as a starting point. Gaps where no cBN particles are present are filled with a binder 3. The binder in the sintered body structure is also referred to as a bonding phase.

Here, the coating material of this embodiment is constituted by elements that have a strong effect of promoting neck growth as described below. Accordingly, in the cBN sintered body of this embodiment, the bonding strength among the cBN particles is significantly high. As a result, cutting tools composed of the cBN sintered body of this embodiment exhibit good wear resistance and the incidence of fracture in interrupted cutting can be notably decreased.

In contrast, in a conventional cBN sintered body shown in FIG. 2, there are portions where cBN particles come into contact with and bond to each other (shown by dotted lines in FIG. 2), but elements such as those constituting the coating material of this embodiment are rarely distributed in these portions. This is because even if a conventional cBN sintered body were to contain the same elements as those contained in the coating material, such elements are treated as part of the binder and the production process is designed to homogeneously disperse such elements throughout the entire structure. Accordingly, in a conventional cBN sintered body, the bonding strength among cBN particles is weak and the bonds among the cBN particles easily break under the conditions in which high impact is repeatedly applied, such as in the case of interrupted cutting, and fracture occurs due to cracks propagating from the broken bonds as starting points.

Whether the element distribution in a sintered body structure is in the aforementioned state can be confirmed through energy dispersive X-ray spectroscopy (EDS) and element mapping over a STEM cross-sectional observation view area, for example. During this process, STEM observation preferably involves high-angle annular dark-field scanning transmission electron microscopy (HAADF-STEM).

The components constituting the cubic boron nitride sintered body of this embodiment are described below.

<Cubic Boron Nitride Particles>

In this embodiment, the content of cBN particles in the cBN sintered body is 80% volume or more and 99% by volume or less. cBN particles are a material that exhibits good hardness and thermal conductivity, and a sufficient tool life is achieved under conditions in which thermal shock is applied to edges such as in the case of interrupted cutting, as long as the content is within the aforementioned range. At a cBN particle content less than 80% by volume, cBN particles may not sufficiently come into contact with one another and thermal conductivity tends to decrease. At a cBN particle content over 99% by volume, the amount of the binder described below in the sintered body structure is excessively small and thus toughness tends to decrease. The cBN particle content is preferably 85% by volume or more and 93% by volume or less.

This volume percent can be achieved by adjusting the volume percent of a powder constituted by cBN particles (hereinafter also referred to as a cBN powder) used in manufacturing a cBN sintered body to be within the above-described range (namely, 80% volume or more and 99% by volume or less) in mixing with other raw materials. The volume percent can be measured by cutting a cBN sintered body and observing the cross section with STEM or the like.

The cBN particles preferably have a small average particle diameter from the viewpoint of increasing the strength of a sintered body structure, and the average particle diameter is preferably 5 µm or less. The average particle diameter of cBN particles is preferably 0.5 µm or more from the viewpoint of increasing toughness of the sintered body structure.

From the viewpoint of balancing strength and toughness of the sintered body structure, the average particle diameter of the cBN particles is more preferably 1 µm or more and 3 µm or less.

<Binder>

The binder according to this embodiment fills gaps between the cBN particles and has an effect of holding and bonding the entire structure. The binder contains at least one element selected from the group consisting of tungsten (W), cobalt (Co), and aluminum (Al). Preferably, the binder further contains at least one element selected from the group consisting of carbon (C), nitrogen (N), boron (B), and oxygen (O).

In other words, the binder may be constituted by a single element such as W, Co, or Al or may be constituted by a mutual solid solution of two or more of these elements. Alternatively, the binder may be constituted by a compound between at least one element selected from W, Co, and Al and at least one element selected from C, N, B, and O. This compound may take a solid solution form.

Examples of the compound or solid solution between at least one element selected from W, Co, and Al and at least one element selected from C, N, B, and L include WC, $W_2C$, $W_3Co_3C$, CoWB, CoC, TiAlN, TiAlCrN, TiAlSiN, TiAlSiCrN, AlCrN, AlCrCN, AlCrVN, TiAlBN, TiAlBCN, MN, AlCN, $AlB_2$, and $Al_2O_3$. Note that when a compound is referred to by a chemical formula as described above in this embodiment, the atomic ratio is not necessarily limited to be in a stoichiometric range and covers every known atomic ratio as long as the atomic ratio is not particularly specified. For example, the notation "TiAlN" is used to indicate not only the case where the Ti/Al atomic ratio is 1:1 but also all known atomic ratios.

Since such a binder can strongly bond to cBN particles and is chemically stable, wear resistance of the sintered body tool can be improved. The content of the binder is preferably 2% by mass or more and 20% or by mass or less.

<Coating Material>

The coating material of this embodiment is constituted by elements having particularly strong effects of promoting neck growth at grain boundaries between cBN particles and thus serves as a bonding promoter.

The coating material preferably contains at least one element selected from the group consisting of chromium (Cr), nickel (Ni), and molybdenum (Mo). Conventionally, such a group of elements has been considered as part of the binder. The feature of this embodiment is that these elements are intentionally used as a coating material. The coating material can contain other components as long as those elements are contained. In other words, the coating material may be a compound or solid solution that contains the above-described elements. Examples of the compound include CrCo, $Mo_2C$, NiC, NiAl, CrAl, and CoCrAl.

The content of the coating material relative to the entire cBN sintered body must be 0.1% by mass or more and 1.5% by mass or less. When the coating material content is less than 0.1% by mass, neck growth does not sufficiently occur and the bonding strength may become insufficient. At a content exceeding 1.5% by mass, toughness may decrease since the strength of the coating material itself is low. The coating material content is more preferably 0.1% by mass or more and 1.0% by mass or less.

From the viewpoint of wear resistance, the coating material content in the sintered body structure is preferably lower than the binder content on a mass basis, and the fraction of the coating material relative to the entire binder is preferably 0.1% by mass or more and 50% by mass.

In this embodiment, the coating material may form a coating layer on a surface of a cBN particle. The coating layer may be a single-layer or a multilayer. The coating layer may be constituted by plural elements.

In this embodiment, substantially all parts of the surface of the cBN particle are preferably coated with the coating material. Here, "substantially all parts of the surfaces are coated" means that the "coverage" measured as below is 70% or more and does not necessarily mean that all parts of the surface of the particle are coated.

Specifically, coverage is calculated as follows. First, a cBN sintered body is cut and the cross section is observed with a STEM at a magnification of 1000 to 10000×. In an observation view area image, a rectangle circumscribing a cBN particle is drawn, and the rectangle is divided into partial regions arranged in at least four columns and four rows. The partial regions that include the circumference (contour line) of the cBN particle are determined as measurement points. The interface at which the cBN particles are in contact with each other is also considered to be a contour line. The magnification and view area are preferably adjusted so that the total number of measurement points is at least 10 or more.

In the same view area, EDS is performed and the number of measurement points where the coating material elements are detected at a concentration of 0.1% by mass or more is counted. The percentage of a value obtained by dividing the measurement point count by the total number of measurement points is assumed to be the "coverage".

As mentioned above, a cBN particle having a coverage of 70% or higher is deemed to have substantially all parts of the surfaces coated with a coating material. An instance in which one hundred cBN particles arbitrarily selected from a sintered body can be deemed to have substantially all parts of the surfaces coated with a coating material is assumed to indicate that the cBN particles have substantially all parts of the surfaces coated with a coating material throughout the entire sintered body structure. The coverage is preferably 80% or more and more preferably 90% or more.

For the measurement described above, a sample for cross-sectional observation can be prepared by, for example, using a focused ion beam (FIB) system, a cross-section polisher (CP), or the like.

As described above, coated particles having substantially all parts of the surfaces coated can be obtained by, for example, coating particles by using a known physical vapor deposition (PVD) system. A physical vapor deposition method is preferable as a method for coating particles since thin and even coating layers are formed.

The cubic boron nitride sintered body of this embodiment described above is manufactured by the following manufacturing method. In other words, a cubic boron nitride sintered body manufactured by the following manufacturing method includes the above-described sintered body structure and exhibits good wear resistance and fracture resistance.

<Method for Manufacturing Cubic Boron Nitride Sintered Body>

Figure 3:
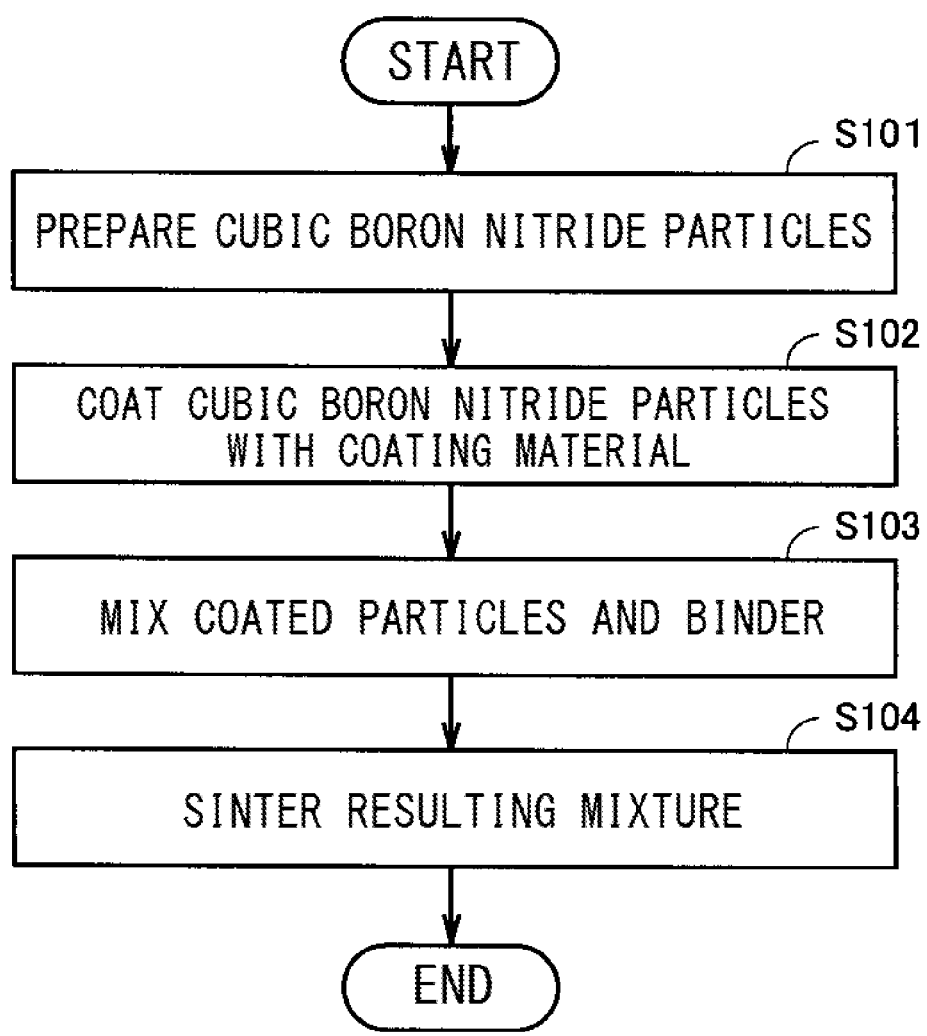
FIG. 3 is a flowchart illustrating a method for manufacturing a cubic boron nitride sintered body according to an embodiment.

FIG. 3 is a flow chart showing a process for manufacturing a cBN sintered body of this embodiment. As shown in FIG. 3, the manufacturing method of this embodiment includes first to fourth steps. Each of the steps is described below.

<First Step>

In the first step (S101), cBN particles are prepared. That is, a cBN powder is prepared. The average particle diameter of the cBN powder can be, for example, 0.5 μm or more and 5 μm or less. The particle size distribution of the cBN powder may be adjusted by classifying as needed.

<Second Step>

In the second step (S102), cBN particles are coated with a coating material (bonding promoter) to obtain coated particles. A known method can be employed as a method for coating cBN particles but a physical vapor deposition method is preferably employed. Surfaces of particles can be provided with thin and even coatings when a physical vapor deposition method is employed. Examples of the physical vapor deposition method include a radiofrequency (RF) sputtering method, a plating method, and a beam vapor deposition method.

In the case where an RF sputtering method is employed as a method for coating particles, preliminary experiments may be conducted to obtain a calibration curve of the coverage versus sputtering time and the conditions may be appropriately adjusted on the basis of the calibration curve so that a predetermined coverage is obtained.

<Third Step>

In the third step (S103), coated particles obtained in the previous step and a binder are mixed to obtain a mixture. If plural metals or compounds are used as a binder, they are preferably crushed and mixed in advance by using, for example, a ball mill. The blend ratios of the coated particles and the binder may be appropriately adjusted so that a sintered body contains a particular amount of cBN particles. The coated particles and the binder may be mixed by a known method, for example, by using a crusher or a mixer such as a ball mill.

The mixture of the coated particles and the binder obtained as such is preferably degassed by a heat treatment in a vacuum furnace.

<Fourth Step>

In the fourth step (S104), the mixture obtained in the previous step is sintered to obtain a sintered body. Specifically, the mixture is introduced into an ultra-high-pressure system and held at a particular pressure and a particular temperature for a particular amount of time. As a result, a cBN sintered body can be obtained.

The pressure during ultra-high-pressure sintering is preferably 5.0 GPa or more and 10.0 GPa or less.

The temperature during ultra-high-pressure sintering is preferably 1500° C. or higher and 2000° C. or lower. The time taken for the ultra-high-pressure sintering is preferably 5 minutes or longer and 30 minutes or shorter.

A cBN sintered body according to this embodiment can be obtained as above.

EXAMPLES

The present invention will now be described in further detail by using Examples which do not limit the invention.

Example 1

Preparation of cBN Sintered Body

A cBN sintered body was prepared as below. First, a cBN powder having an average particle diameter of about 1.2 μm was prepared so as to obtain a powder constituted by coated particles (first step). Then surfaces of the cBN particles were coated with a coating material, Cr, by using an RF sputtering PVD system (second step). During this process, the sputtering conditions were adjusted so that the fraction of the coating material (Cr) relative to the entire cBN sintered body was 0.6% by mass.

Next, a mixture obtained by crushing and mixing a WC powder, a Co powder, and an Al powder was heat-treated in vacuum at 1200° C. for 30 minutes to obtain a compound. The compound was crushed by using a planetary ball mill to obtain a binder powder.

The powder constituted by coated particles and the binder powder were mixed so that the content of the cBN particles in the cBN sintered body was 93% by volume and the resulting mixture was homogeneously mixed by a ball mill mixing method by using a pot with a Teflon (registered trademark)-coated inner wall and $Si_3N_4$ ball media so as to obtain a mixture powder (third step).

The mixture powder was held at 900° C. for 20 minutes in a vacuum furnace to conduct degassing. The mixture powder after degassing was charged into a Mo capsule, and held at a pressure of 6.5 GPa and a temperature of 1600° C. for 20 minutes by using an ultra-high-pressure system so as to obtain a cBN sintered body (fourth step).

Comparative Example 1

A cBN sintered body of Comparative Example 1 was obtained as in Example 1 except that the second step in "Preparation of cBN sintered body" described above was not performed. In other words, the cBN sintered body of Comparative Example 1 does not contain a coating material.

Examples 2 to 5 and Comparative Examples 2 and 3 cBN sintered bodies of Examples 2 to 5 and Comparative Examples 2 and 3 were obtained as in "Preparation of cBN sintered body" of Example 1 except that the fraction of the coating material (Cr) relative to the entire cBN sintered body was changed to a figure shown in Table 1.

Comparative Example 4

A cBN sintered body of Comparative Example 4 was obtained as in Example 2 except that the second step in "Preparation of cBN sintered body" described above was not performed and that, in the third step, a mixture powder was obtained by mixing a powder constituted by cBN particles, a binder, and a Cr powder. In other words, the cBN sintered body of Comparative Example 4 contains an element that can act as a coating material but the cBN particles are not coated with this element.

Examples 6 and 7 cBN sintered bodies of Examples 6 and 7 were obtained as in Example 2 except that in the second step in "Preparation of cBN sintered body" described above, Ni and Mo were used instead of Cr.

Examples 8 to 10 and Comparative Examples 5 to 9 cBN sintered bodies of Examples 8 to 10 and Comparative Examples 5 to 9 were obtained as in Example 1 and Comparative Example 1 except that in the third step in "Preparation of cBN sintered body" described above, mixing was conducted so that the content of the cBN particles in the sintered body was the figure shown in Table 1.

<Analysis of Sintered Body Structure>

Each of the cBN sintered bodies containing coating materials obtained as above was subjected to STEM observation and EDS and an element map of the coating material element was created. The results confirmed that in the cBN sintered bodies of Examples 1 to 10, the cBN particles were coated with the coating material to a degree that the contours of cBN particles were clearly identifiable. In other words, it was confirmed that the coating material was present in grain boundaries between cBN particles. The coverage determined by the above-described method was 70% or more in all cases. Accordingly, the cBN particles in these sintered bodies can be deemed to have substantially all parts of the surfaces coated with the coating material.

In contrast, the detected Cr amount at the grain boundaries between the cBN particles in the cBN sintered body of Comparative Example 4 was small, and the contours of the cBN particles could not be clearly identified by Cr mapping. The coverage determined by the above-described method was less than 70%.

<Evaluation of Cutting Performance>

The cBN sintered bodies of Examples and Comparative Examples obtained as above were used to prepare cutting tools and the cutting performance (wear resistance and fracture resistance) thereof was evaluated. Specifically, a cutting tool was prepared by brazing a cBN sintered body to a substrate composed of a cemented carbide and forming the resulting product into a particular shape.

Each cutting tool was used in light interrupted cutting of sintered parts and the cutting performance was evaluated. Specifically, cutting was performed under the conditions described below and the amount of removed edge after performance of 3 km of cutting was compared to evaluate wear resistance and fracture resistance. The results are show in Table 1.

<Cutting Conditions>
Workpiece: 0.8C-2.0Cu-balance Fe (JPMA: SMF4040)
Cutting speed: Vc=200 m/min.
Feed rate: f=0.1 mm/rev.
Depth of cut: ap=0.2 mm
Wet cutting (with cutting fluid)

TABLE 1

| | cBN sintered body | | | | | |
|---|---|---|---|---|---|---|
| | | Coating material | | | | |
| | cBN particles Content (vol %) | Element contained | Fraction of coating material relative to entire binder (mass %) | Fraction of coating material relative to entire sintered body (mass %) | Addition method | Cutting performance |
| Example 1 | 93 | Cr | 5.9 | 0.6 | Sputtering method | 128 |
| Example 2 | 93 | Cr | 6.9 | 0.7 | Sputtering method | 141 |
| Example 3 | 93 | Cr | 8.0 | 0.8 | Sputtering method | 129 |
| Example 4 | 93 | Cr | 10.1 | 1.0 | Sputtering method | 124 |
| Example 5 | 93 | Cr | 14.9 | 1.5 | Sputtering method | 115 |

TABLE 1-continued

| | cBN sintered body | | | | | |
|---|---|---|---|---|---|---|
| | | | Coating material | | | |
| | cBN particles Content (vol %) | Element contained | Fraction of coating material relative to entire binder (mass %) | Fraction of coating material relative to entire sintered body (mass %) | Addition method | Cutting performance |
| Example 6 | 93 | Ni | 6.9 | 0.7 | Sputtering method | 139 |
| Example 7 | 93 | Mo | 6.9 | 0.7 | Sputtering method | 138 |
| Example 8 | 80 | Cr | 2.5 | 0.7 | Sputtering method | 112 |
| Example 9 | 85 | Cr | 3.3 | 0.7 | Sputtering method | 125 |
| Example 10 | 99 | Cr | 49.8 | 0.7 | Sputtering method | 132 |
| Comparative Example 1 | 93 | None | — | — | — | 100 (reference) |
| Comparative Example 2 | 93 | Cr | 6.7 | 1.9 | Sputtering method | 100 |
| Comparative Example 3 | 93 | Cr | 8.4 | 2.4 | Sputtering method | 71 |
| Comparative Example 4 | 93 | Cr | 6.9 | 0.7 | Mixed as binder powder | 104 |
| Comparative Example 5 | 70 | None | — | — | — | 59 |
| Comparative Example 6 | 70 | Cr | 1.6 | 0.7 | Sputtering method | 71 |
| Comparative Example 7 | 80 | None | — | — | — | 94 |
| Comparative Example 8 | 85 | None | — | — | — | 96 |
| Comparative Example 9 | 99 | None | — | — | — | 99 |

In Table 1, the content (vol %) of cBN particles and the fraction of the coating material (mass %) were determined by the following methods. First, a flat and smooth observation section was taken from the cBN sintered body by milling and the structure of the cubic boron nitride was observed with a scanning electron microscope (hereinafter referred to as SEM) in a view area of 10,000× magnification where 10 nm particle diameter was identifiable. The fraction of the cBN particles relative to the entire sintered body was determined from the obtained SEM image by image processing. The obtained area fraction was assumed to hold true for the distribution in the depth direction as well and the fraction in terms of vol % was calculated based on this assumption and indicated in Table 1. In image processing, the image was binarized based on the color density. Black had been identified as cBN, gray had been identified as an Al—Co compound, and white had been identified as a W compound by elemental analysis conducted in advance. The content of the cBN particles and the region and shape of the binder were determined based on this finding. Next, the flat and smooth observation section was subjected to elemental analysis by energy dispersive X-ray spectroscopy (EDS) and the mass percent of the coating material was determined, which is shown in Table 1.

The figures shown in the column of the cutting performance in Table 1 are relative evaluation figures based on the removed amount of the cutting tool of Comparative Example 1. A relative evaluation figure is obtained by dividing the removed amount of the cutting tool of Comparative Example 1 by the removed amount of each cutting tool and multiplying the result by 100. In other words, the larger the figure, the less the removed amount and the better the wear resistance and fracture resistance.

Table 1 clearly shows that cutting tools prepared from cBN sintered bodies of Examples that contain cubic boron nitride particles, a binder, and a coating material, in which the content of the cubic boron nitride particles is 80% by volume or more and 99% by volume or less, the binder contains at least one element selected from the group consisting of tungsten, cobalt, and aluminum, the content of the coating material is 0.1% by mass or more and 1.5% by mass or less, and the cubic boron nitride particles are coated with the coating material, exhibited wear resistance and fracture resistance superior to cutting tools prepared from cBN sintered bodies of Comparative Examples that did not satisfy these conditions.

While the embodiments and examples of the present invention have been described above, combining the structures of the embodiments and examples described above as needed has been anticipated from the beginning.

The embodiments and examples disclosed herein are merely illustrative and should not be construed as limiting. The scope of the present invention is shown not by the description above but by the claims and covers the claims and equivalents thereof and all modifications within the scope.

REFERENCE SIGNS LIST 1 cBN particle, 2 coating material, 3 binder

The invention claimed is:

1. A method for manufacturing a cubic boron nitride sintered body having a cubic boron nitride particle content of 80% by volume or more and 99% by volume or less, the method comprising:
    a first step of preparing cubic boron nitride particles;
    a second step of coating the cubic boron nitride particles with a coating material so as to obtain coated particles;
    a third step of mixing the coated particles and a binder to obtain a mixture; and
    a fourth step of sintering the mixture at a temperature of 1500° C. or higher and 2000° C. or lower,
    wherein the coating material contains at least one element selected from the group consisting of chromium and molybdenum.

2. The method for manufacturing a cubic boron nitride sintered body according to claim 1, wherein the coated particles are particles having substantially all parts of surfaces coated with the coating material.

3. The method for manufacturing a cubic boron nitride sintered body according to claim 1, wherein the binder contains at least one element selected from the group consisting of tungsten, cobalt, and aluminum.

4. The method for manufacturing a cubic boron nitride sintered body according to claim 3, wherein the binder further contains at least one element selected from the group consisting of carbon, nitrogen, boron, and oxygen.

5. The method for manufacturing a cubic boron nitride sintered body according to claim 1, wherein the second step is a step of coating the cubic boron nitride particles with the coating material by a physical vapor deposition method.

6. A cubic boron nitride sintered body comprising cubic boron nitride particles, a binder, and a coating material,
    wherein a content of the cubic boron nitride particles is 80% by volume or more and 99% by volume or less,
    the binder contains at least one element selected from the group consisting of tungsten, cobalt, and aluminum,
    a content of the coating material is 0.1% by mass or more and 1.5% by mass or less,
    surfaces of the cubic boron nitride particles are coated with the coating material, and
    portions where the coated cubic boron nitride particles come into contact with each other are directly bonded,
    wherein the coating material contains at least one element selected from the group consisting of chromium and molybdenum.

7. The cubic boron nitride sintered body according to claim 6, wherein substantially all parts of the surfaces of the cubic boron nitride particles are coated with the coating material.

8. The cubic boron nitride sintered body according to claim 6, wherein the binder further contains at least one element selected from the group consisting of carbon, nitrogen, boron, and oxygen.

9. The cubic boron nitride sintered body according to claim 6, wherein the content of the cubic boron nitride particles is 85% by volume or more and 93% by volume or less.

10. The method for manufacturing a cubic boron nitride sintered body according to claim 1, wherein the second step includes a heat treatment.

* * * * *